J. BURNS.
Grain Drier.
No. 61,393.	Patented Jan. 22, 1867.
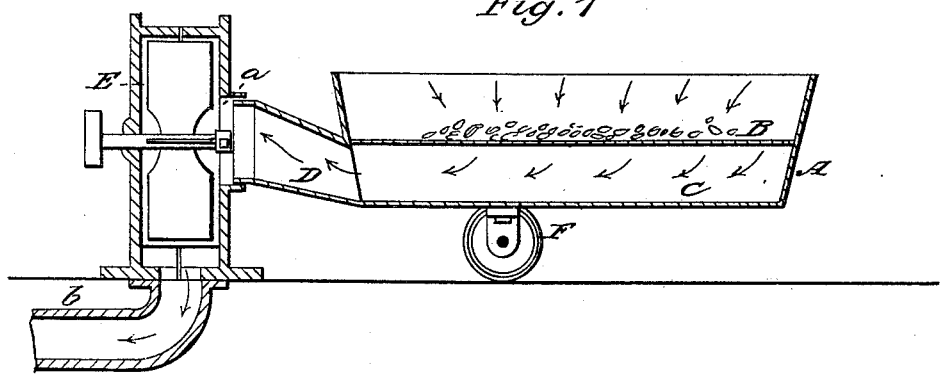
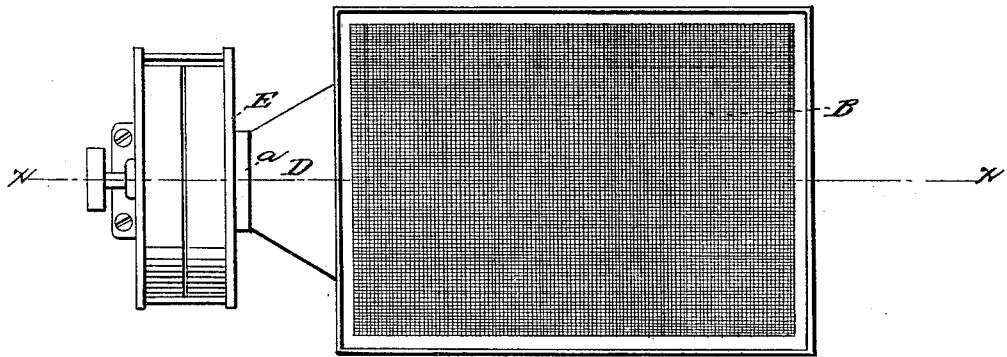
Witnesses:
F. A. Jackson
Wm Truien
Inventor:
Jabez Burns
Per Munn & Co
Attorneys

United States Patent Office.

JABEZ BURNS, OF NEW YORK, N. Y.

Letters Patent No. 61,393, dated January 22, 1867.

---

COOLER FOR COFFEE, &c.

---

*The Schedule referred to in these Letters Patent and making part of the same.*

---

TO ALL WHOM IT MAY CONCERN:

Be it known that I, JABEZ BURNS, of the city and county and State of New York, have invented a new and improved Cooler for Coffee and other articles; and I do hereby declare that the following is a full, clear, and exact description thereof, which will enable others skilled in the art to make and use the same, reference being had to the accompanying drawing, forming a part of this specification, in which—

Figure 1 represents a longitudinal vertical section of this invention, the line $x\,x$, fig. 2, indicating the plane of section.

Figure 2 is a plan or top view of the same.

Similar letters of reference indicate like parts.

This invention consists in cooling coffee as the same is discharged from the roaster, and other articles of a similar nature, by a downward draught, produced by a suction-blower or other suitable apparatus, in such a manner that the smoke and dust which generally rise from the coffee, or other article to be cooled, are prevented from filling the room, and all inconvenience and danger of fire arising from that source are avoided.

A represents a broad flat-bottomed pan or vat, made of sheet metal or any other suitable material, and provided with a perforated false bottom, B, which is secured in the pan at some distance above its real bottom C. From the side of the pan, between the two bottoms B and C, emanates a tube, D, which is so formed that it can be readily secured in the central aperture $a$ of a suction-blower, E. The blower is secured to the floor at a height corresponding to that of the tube D of the pan C, and receives and bears the tube, and holds the pan in position. The tube $b$ is below the floor, and is out of the way of the operatives. This blower is so arranged that it draws the air through the perforated false bottom B, and discharges it through the pipe $b$, which may be made to lead to the ash-pan of the furnace, or to any place where smoke and dust will not produce any inconvenience. The pan A may be placed on wheels, F, so that it can be readily brought in the proper position in relation to the blower, and that one pan can be readily removed and replaced by another whenever it may be desirable or convenient. The coffee or other material to be cooled is poured into the pan A on the perforated bottom, so as to form a stratum of more or less thickness, and after the connection between the pan and blower has been effected the latter is set in motion. A downward current of air is thus caused to pass through the coffee or other material to be cooled, and the smoke and dust which generally rise from the articles to be cooled are drawn down and discharged through the pipe $b$. With ordinary coolers for coffee, etc., the smoke and dust are allowed to rise and to fill the room, and thereby much inconvenience is caused to persons employed near to said cooler; and furthermore, the heated dust is liable to catch fire and to cause considerable damage. By the employment of a downward current of air in cooling, all the smoke and dust are kept out of the room and apartment in which the operation is carried on, and if desired said smoke and dust can be utilized by injecting them into the furnace where the same serve to keep up combustion.

I claim as new, and desire to secure by Letters Patent—

1. As an article of manufacture the portable cooler herein described, the same consisting of the open mounted pan A, with perforated false bottom B, and connecting tube D, as and for the purpose specified.

2. The arrangement of the stationary suction-blower E on the floor, with the pipe $b$ below it, in combination with the removable mounted cooler A B C, supported by its tube D, as and for the purpose specified.

JABEZ BURNS.

Witnesses:
  W. HAUFF,
  ALEX. F. ROBERTS.